United States Patent [19]

Richard et al.

[11] 4,350,309

[45] Sep. 21, 1982

[54] TAPE REEL HUB INCLUDING A CANTILEVER BEAM SECTION TO REDUCE TAPE TENTING

[75] Inventors: Maurice E. Richard; Daniel J. Winarski, Tucson, Ariz.

[73] Assignee: International Business Machines Corporation, Armonk, N.Y.

[21] Appl. No.: 161,808

[22] Filed: Jun. 23, 1980

[51] Int. Cl.³ ..................... B65H 75/18; B65H 75/28
[52] U.S. Cl. .................................. 242/68.3; 242/68.5; 242/74
[58] Field of Search ....................... 242/68.5, 68.6, 74, 242/71.8, 68.3, 195, 74.1, 74.2

[56] References Cited

U.S. PATENT DOCUMENTS

| | | | |
|---|---|---|---|
| 3,132,822 | 5/1964 | Arthur | 242/68.5 |
| 3,395,872 | 8/1968 | Fattori | 242/71.8 |
| 3,664,607 | 5/1972 | Trefzger et al. | 242/74 X |
| 3,695,541 | 10/1972 | Lee | 242/71.8 |
| 3,802,638 | 4/1974 | Dragan | 242/74 |
| 3,840,196 | 10/1974 | Presentey | 242/74 |
| 3,973,740 | 8/1976 | Schankler | 242/68.5 |

*Primary Examiner*—John M. Jillions
*Attorney, Agent, or Firm*—R. E. Cummins

[57] ABSTRACT

A reel for web material such as magnetic recording tape is disclosed. The reel may be advantageously employed in a reel-to-reel magnetic tape transport where magnetic tape is wound under tension that is converted to radial forces which subject layers of the tape disposed over discontinuities associated with the reel hub to adversely affect the transducing relationship between the flux gap and the transducer of the recording surface of the tape.

The section of the cylindrical tape receiving surface which is associated with a discontinuity is formed to function as a cantilever beam with the distal end of the beam being aligned with the discontinuity. The outer portion of the hub is made of relatively compressible material, while the inner portion is relatively solid. Compressibility of the outer portion is enhanced by providing a plurality of circumferentially disposed cylindrically shaped openings which also function to relieve radially induced forces on the tape layers.

9 Claims, 6 Drawing Figures

TAPE REEL HUB INCLUDING A CANTILEVER BEAM SECTION TO REDUCE TAPE TENTING

DESCRIPTION

This invention relates in general to reels for web material and in particular to a take-up reel, or a supply reel, for use in a reel-to-reel magnetic tape transport system in which the magnetic tape is wound under tension on the reels.

BACKGROUND OF THE INVENTION

The prior art has disclosed various apparatus for transporting magnetic tape past a magnetic transducer for the writing and reading of information on the tape. As a general rule, the type of transport employed is generally related to the type of information that is to be recorded on the tape to be transported. Where digital data is stored on the tape and the information is recorded from or read out to a data processing system, the characteristics of the tape transport are considerably different from tape transports employed, for example, in audio types of recorders. In tape transports for use with data processing systems, the tape speed, acceleration and deceleration, characteristics are considerably more stringent.

A number of reel-to-reel capstanless tape transports have been disclosed in the art where a separate drive motor is associated with each reel and a control system is provided for the motors which results in the take-up reel effectively pulling the tape through the tape path past the magnetic transducer or the supply reel, which is generally removable, pulling the tape back from the take-up reel through the tape path in the reverse direction. As a result, tape that is wound on either reel is usually wound under tension resulting in each layer imposing a a radial compressive force on previously wound layers.

The radial forces exerted on the inner layers results in a problem whenever a discontinuity is formed in the cylindrical surface of the hub or a discontinuity is formed at the point where the end of the tape is attached to the reel hub. The problem results in a "tenting" of the tape as it passes the read-write gap of the magnetic transducer on the narrow segment of the tape which overlapped the initial discontinuity. The degree of "tenting" and the seriousness of the problem is directly related to the size of the discontinuity, the radial forces resulting from wrapping the tape under tension, the length of time the layers are exposed to the discontinuity, and the material from which the media is manufactured.

It has been found in accordance with the present invention that by forming a portion of the cylindrical section of the hub to function as a cantilever type beam in the area where the end of the tape first engages the cylindrical hub of the reel, subsequent layers of the tape have less tendency to "tent" since the radial pressure is reduced at the discontinuity by the bending action of the cantilever beam. Further reduction in "tenting" can be achieved if the outer portion of the hub is made more compressible relative to the inner portion of the hub which is coupled to the drive motors. The outer portion may be made more compressible by providing a series of openings in the outer solid portion of the hub or by a suitable choice of materials different than the materials employed for the inner portion of the hub.

By providing a take-up reel where the portion of the hub which attaches to the drive motor is solid, rigid, and uncompressible and the outer portion of the hub is compressible in a radial direction, the radial forces imposed on each layer of tape is substantially decreased, and the possibility of a discontinuity causing a "tenting" of the tape as it passes the magnetic transducer is considerably reduced.

It is, therefore, an object of the present invention to provide an improved take-up reel for use in a web transport operation.

A further object of the present invention is to provide an improved reel for magnetic tape to be employed in a tape transport wherein the tape may be wound on the reel under tension.

A further object of the present invention is to provide a take-up reel in which the hub of the reel has an outer compressible portion extending radially inward to a relatively solid, noncompressible inner portion which is adapted to be connected to the shaft of the driving motor.

A still further object of the present invention is to provide an improved reel for magnetic tape of the type in which the cylindrical surface of the reel hub on which the first layer of tape is wrapped is not continuous, resulting in a pair of spaced discontinuities defined by the adjacent edges of the cylindrical surface where the outer cylindrical portion of the hub is radially compressible and the inner cylindrical portion is relatively noncompressible.

BRIEF DESCRIPTION OF THE DRAWINGS

These and other objects of the invention will become apparent from the following detailed description in which.

DESCRIPTION OF THE INVENTION

Figure 1:
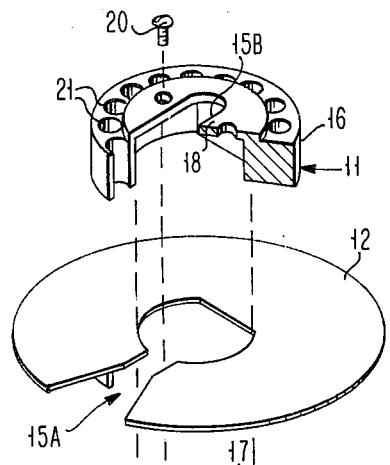
FIG. 1 is an exploded isometric view of the improved take-up reel.
Figure 2:
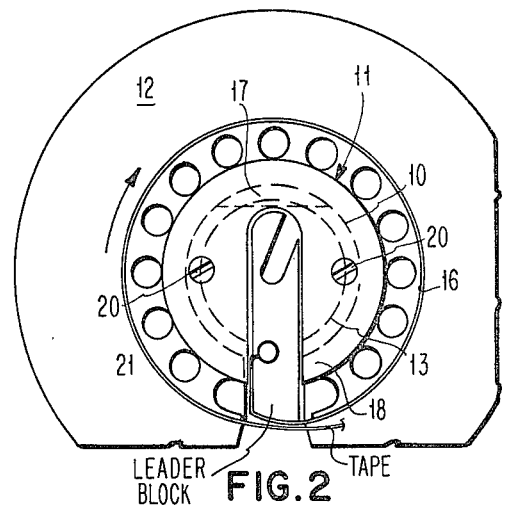
FIG. 2 is a plan view of the take-up reel shown in FIG. 1.

FIG. 1 is an exploded view of a take-up reel embodying the present invention, while FIG. 2 is an assembled view of the take-up reel shown in FIG. 1. As shown in FIGS. 1 and 2, the reel hub comprises an inner member 10 and an outer cylindrical member 11 and a reel flange 12. Member 10, as shown, is made integral with the base 13 which attaches to the motor 14. If desired cylindrical member 10 could be formed separate from base 13. Member 10, as shown, is provided with a groove or U-shaped slot 15 for receiving a leader block (FIG. 2) which is attached to the leading edge of the tape to be wound on the surface 16 of hub member 11. A chordal section 17 has been eliminated from the generally cylindrical outline of member 10 to counterbalance the effect of slot 15 on the rotational stability of the reel at high speeds.

Flange member 12 is provided with a corresponding slot 15A and, when assembled, rests on the upper surface of base 13.

Hub member 11 is provided with a recess which accommodates hub member 10. A raised section 18 which is an integral part of hub 11 is provided with a slot 15B corresponding to slots 15 and 15A. Member 11 is attached to member 10 by any suitable means, such as screws 20.

Member 10, which forms the inner portion of the hub, is made of relatively solid material, such as aluminum, which is relatively incompressible. Member 11, on the other hand, which forms the outer portion of the hub, is made of material which is relatively compressible, such as polycarbonate. The generally smooth outer surface 16 of member 11 intersects the radially extending sides of slot 15 and forms two spaced-apart discontinuities in the otherwise generally smooth tape receiving surface 16. The spacing of these discontinuities, as shown, is relatively large since it is contemplated that the hub is adapted to receive a leader block, as shown in FIG. 2, attached to the leading edge of the tape from the supply reel. The spacings of the discontinuities can be reduced considerably, for example, to the thickness of the tape, or just slightly larger, when a leader block is not required.

Figure 4:
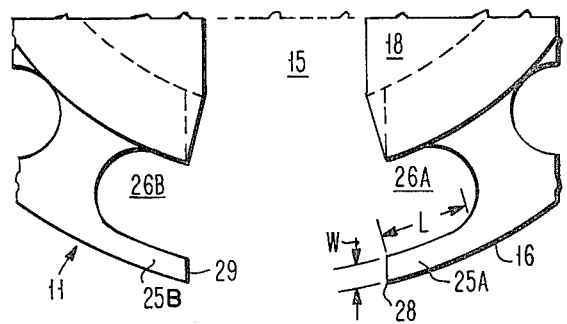
FIG. 4 is a side view of layers of the tape illustrating the potential effect on segments of the tape disposed over a discontinuity in prior art tape reels.
Figure 5:
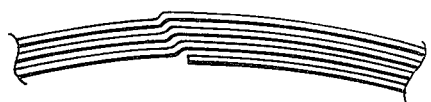
FIG. 5 is a schematic illustration of "tenting" of a segment of magnetic tape.
Figure 5:
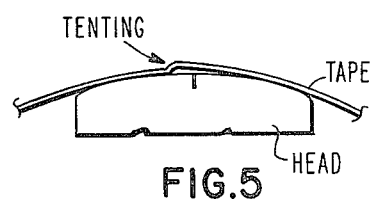

FIG. 5 illustrates the "tenting" effect which causes a narrow section of the tape to be spaced further from the flux gap than desired. In order to reduce the adverse "tenting" effects that these discontinuities may have on layers of the tape which overlay them (as shown in FIG. 4), the sections of the cylindrical surface adjacent these discontinuities are formed to function as cantilever type beams with the distal end of the beam being at the discontinuity, as shown more fully in FIG. 3.

Figure 3:
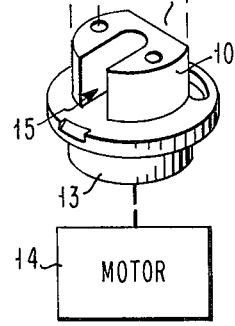
FIG. 3 is a partial enlarged view of a section of the reel illustrating how a segment of the reel hub may be constructed to form a cantilevered beam.

FIG. 3 is an enlarged section of the area of the hub shown in FIGS. 1 and 2 illustrating how sections 25A and 25B of member 11 are formed as cantilever beams by the removal of material from areas 26A and 26B.

The discontinuities 28 and 29 in the generally smooth cylindrical tape receiving surface 16 occur at the distal end of the beam sections 25A and 25B. The length L of section 25A and the thickness W of section 25B are the important dimensions of the beam, and the size and shape of openings 26A and 26B are immaterial from the standpoint of reducing the tendency of the tape of "tent" at the discontinuity. The shape of openings 26A and 26B, as shown, reflect the fact that the hub should preferably also be balanced since it is subject, at times, to relatively high R.P.M. forces from motor 14 during a winding operation.

The length L and width W of the beam sections 25A and 25B may be determined in practice by several factors. The two major factors are first, the material employed for the hub section 11 or, more specifically, the modulus of elasticity for that material which is generally available in most strength of material handbooks, and second, the radial forces to which the tape will be exposed as a result of the tape being wound under tension on the hub. This latter factor may be calculated mathematically for a hub of given dimensions and tape tension in accordance with known formulas.

Once the radial force to which the hub is subjected is established, the load is assumed distributed across the length of the beam, and conventional cantilever beam equations can be employed to establish the dimensions L and W for various reductions in radial forces desired at the discontinuities.

The compressibility of hub portion 11 in a radial direction may be increased by the provision of a plurality of openings which extend through the solid portion of the member 11 in a direction parallel to the axis of the rotation of the reel. The number, shape and size of these holes can be calculated from known equations or a NASTRAN finite element analysis can be made for various values of the parameters involved. It has been found from such an analysis that the cantilever beam sections are approximately twenty times more effective in reducing the radial force at the point of the discontinuity than are the provisions of the openings. It can also be shown by such an analysis that the provisions of the openings in a practical reel hub increase the compressibility of the hub member by a factor of 2.

Figure 6:
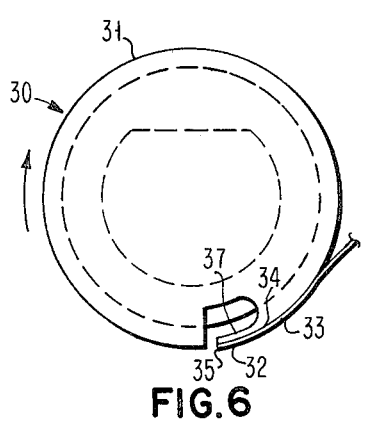
FIG. 6 illustrates an embodiment of the invention shown in FIG. 1 for use where the end of the tape is affixed to the cylindrical surface of the hub which defines the cantilever beam.

FIG. 6 illustrates an embodiment of the invention which may be employed, for example, on the hub of a supply reel. On the supply reel, the "trailing" edge of the tape is "permanently" attached to the supply reel. One method often employed is to affix an end portion of the tape by adhesive to the cylindrical surface of the hub, as shown in FIG. 4. In a reel-to-reel capstanless tape transport, the supply reel functions as the take-up reel during a rewind operation so that quite often the tape is being wound under tension and may be subjected to "tenting" where the discontinuity caused by the edge of the tape is encountered. Where the supply reel is replacable, the "tenting" problem may become more severe in that the tape is generally exposed to the discontinuity for a considerably longer period of time, while the supply reel is off the tape transport. "Tenting" may occur in some circumstances as a result of relatively small discontinuities.

As shown in FIG. 6, the hub 30 of the reel has a generally cylindrical surface 31 on which end 32 of tape web 33 is affixed by adhesive material 34. The edge 35 of the tape, therefore, presents a discontinuity to the second and subsequent layers of tape as the reel is rotated clockwise, as shown in FIG. 6, to wind up the tape. By forming section 37 of surface 31 to function as a cantilever beam, the potentially adverse effect of edge 35 is considerably reduced on the second and subsequent layers of tape. As mentioned previously, the size and shape of the opening which is made in the solid hub material is not critical so long as the section 37 functions as a cantilever beam to reduce the radial force on the segment of the layers which overlay edge 35.

It will be apparent to those skilled in the art that the manner in which the leading edge of the tape on the supply reel is attached to the leader block will affect the design of the end surface of the leader block that is coextensive with the surface 16 of the hub. As shown in FIG. 2, the tape is attached to the side of the leader block and a slight "radial draft" on the media bearing edge is provided for the end surface of the leader block.

While the invention has been particularly shown and described with reference to a preferred embodiment thereof, it will be understood by those skilled in the art that various changes in the form and details may be made therein without departing from the spirit and scope of the invention.

Having thus described our invention, what we claim as new, and desire to secure by Letters Patent is:

1. A reel for winding magnetic tape, including a hub member adapted to be rotated about an axis in both directions, the rotation of said member in one of said directions causing said tape to be wound under known tension on said hub member in a plurality of layers generating a predetermined radial inward compression force on said layers and said hub which is proportional to said known tension, said hub member including a generally continuous cylindrical tape receiving surface one predetermined portion of which is adapted to receive an end portion of the first layer of the tape to be wound on said hub, one outer circumferential section of said hub defining a cantilever beam of circumferential length L and radial depth W, one side of said beam being coextensive with said predetermined portion, said length and depth of said cantilever beam being determined in accordance with the modulus of elasticity of the material of said one outer circumferential section and said radial inward compression force to control the bending action of the distal end of said beam, whereby the tendency of a discontinuity associated with said end portion of said first layer of said tape to adversely affect subsequent layers of said wound tape is reduced since the controlled bending action of the distal end of said cantilever beam decreases said radial force to a point which prevents the tape from tenting when it is unwound.

2. The reel set forth in claim 1 in which said hub member comprises an inner portion of relatively noncompressible material which is adapted to be coupled to a driving element, and an outer portion of relatively compressible material on which said tape is wound.

3. The reel set forth in claim 1 in which a radially extending slot is provided in said hub portion for receiving a leader block attached to the end of the tape to be wound on said hub.

4. The reel set forth in claim 3 in which the inner section of the sides of said slot with said generally cylindrical tape receiving surface define a pair of spaced discontinuities, one of which is at the distal end of said cantilever beam formed in said one outer circumferential section.

5. The reel set forth in claim 4 in which said hub section includes a second outer circumferential section defining a second cantilever beam, the distal end of which is coextensive with the other said discontinuity.

6. The reel set forth in claim 2 in which said outer portion is provided with a plurality of circumferentially disposed, equally spaced, cylindrically shaped openings which extend parallel to the axis of rotation of said reel from opposite external surfaces to increase the radial compressibility of said outer section when subjected to radial pressures from tape wound on said hub under tension.

7. The reel set forth in claim 1 in which said one outer circumferential section of said hub is adapted to receive said end portion with the transverse edge of said end portion being disposed substantially over the edge of said distal end of said cantilever beam.

8. The reel set forth in claim 1 in which said inner portion and said outer portion of said hub are individual, separable members.

9. The reel set forth in claim 8 in which said inner portion is formed integral with a base member which is adapted to be attached to a rotatable shaft.

* * * * *